United States Patent
Wang et al.

(10) Patent No.: US 9,665,925 B2
(45) Date of Patent: May 30, 2017

(54) METHOD AND TERMINAL DEVICE FOR RETARGETING IMAGES

(71) Applicant: Xiaomi Inc., Beijing (CN)

(72) Inventors: Lin Wang, Beijing (CN); Tao Zhang, Beijing (CN); Zhijun Chen, Beijing (CN)

(73) Assignee: XIAOMI INC., Haidian District, Beijing (CN)

( * ) Notice: Subject to any disclaimer, the term of this patent is extended or adjusted under 35 U.S.C. 154(b) by 108 days.

(21) Appl. No.: 14/666,311

(22) Filed: Mar. 24, 2015

(65) Prior Publication Data

US 2015/0371367 A1    Dec. 24, 2015

Related U.S. Application Data

(63) Continuation of application No. PCT/CN2014/091752, filed on Nov. 20, 2014.

(30) Foreign Application Priority Data

Jun. 24, 2014   (CN) .......................... 2014 1 0287125

(51) Int. Cl.
   *G06K 9/32*    (2006.01)
   *G06T 3/00*    (2006.01)
   *G06K 9/46*    (2006.01)

(52) U.S. Cl.
   CPC .......... *G06T 3/0012* (2013.01); *G06K 9/4671* (2013.01)

(58) Field of Classification Search
   CPC ........................... G06K 9/4671; G06T 3/0012
   (Continued)

(56) References Cited

U.S. PATENT DOCUMENTS

| 7,477,800 B2 * | 1/2009 | Avidan .................. G06T 3/0012 382/254 |
| 8,218,895 B1 | 7/2012 | Gleicher et al. |

(Continued)

FOREIGN PATENT DOCUMENTS

| CN | 101053531 A | 10/2007 |
| CN | 101510299 A | 8/2009 |

(Continued)

OTHER PUBLICATIONS

Vidya Setlur et al., "Automatic Image Retargeting", University of Canterbury MUM 2005, published in 2005, pp. 59-68.*

(Continued)

*Primary Examiner* — Mekonen Bekele
(74) *Attorney, Agent, or Firm* — Jun He Law Offices P.C.; James J. Zhu (57) ABSTRACT

The present disclosure relates to a method and a terminal device for image retargeting, and belongs to the computer technical field. The method includes: establishing a saliency model for an original image; calculating a saliency value of each pixel point in the original image based on the saliency model; and retargeting a target image according to the saliency value of each pixel point, original resolution of the original image and target resolution of the target image. Thus, the present disclosure may solve the problem of complicated analysis process and huge calculation amount caused by analyzing image contents of the original image to obtain important pixel points. Consequently, technical effects of reducing calculation amount may be achieved.

17 Claims, 4 Drawing Sheets

(58) Field of Classification Search
USPC ......... 382/298, 254, 299, 199, 260; 348/441
See application file for complete search history.

(56) References Cited

U.S. PATENT DOCUMENTS

| | | | |
|---|---|---|---|
| 8,274,602 B2* | 9/2012 | Fujisawa | H04N 7/014 348/441 |
| 8,280,191 B1 | 10/2012 | Avidan et al. | |
| 8,494,302 B2 | 7/2013 | Ding et al. | |
| 2004/0170318 A1 | 9/2004 | Crandall et al. | |
| 2009/0251594 A1 | 10/2009 | Hua et al. | |
| 2011/0305397 A1* | 12/2011 | Piramuthu | G06T 11/60 382/199 |
| 2012/0120311 A1* | 5/2012 | De Haan | G06T 3/4092 348/441 |
| 2012/0121204 A1* | 5/2012 | Ding | G06T 3/0012 382/260 |
| 2012/0281923 A1* | 11/2012 | Irani | G06K 9/6223 382/218 |
| 2013/0050574 A1* | 2/2013 | Lu | G06K 9/4671 348/441 |
| 2013/0084013 A1* | 4/2013 | Tang | G06K 9/4671 382/195 |
| 2013/0342758 A1* | 12/2013 | Greisen | G06T 3/0012 348/441 |
| 2016/0163058 A1* | 6/2016 | Wei | G06T 7/0081 382/171 |

FOREIGN PATENT DOCUMENTS

| | | |
|---|---|---|
| CN | 101866484 A | 10/2010 |
| CN | 101520894 B | 3/2011 |
| CN | 102129693 A | 7/2011 |
| CN | 102473285 A | 5/2012 |
| CN | 102568249 A | 7/2012 |
| CN | 102722891 A | 10/2012 |
| CN | 103020985 A | 4/2013 |
| CN | 103136766 A | 6/2013 |
| CN | 103226824 A | 7/2013 |
| CN | 104123720 A | 10/2014 |
| JP | 2010081996 A | 4/2010 |
| JP | 2011504682 A | 2/2011 |
| KR | 20100074927 A | 7/2010 |
| RU | 2012103841 A | 8/2013 |

OTHER PUBLICATIONS

Michael Rubinstein et al., "A Comparative Study of Image Retargeting", ACM Transactions on Graphics, vol. 29, No. 6, Article 160, Publication date: Dec. 2010, pp. 9, from 160.1-160-9.*
Fang et al., "Saliency Detection in the Compressed Domain for Adaptive Image Retargeting", 2012 IEEE, pp. 3888-3901.*
Daniel Vaqueroa et al., "A survey of image retargeting techniques", Proc. of SPIE vol. 7798 779814-1, pub. 2010, pp. 15.*
"International Search Report for PCT/CN2014/091752".
Extended European Search Report for EP15173621.
Vaqueroa et al. "A survey of image retargeting techniques", Proc. of SPIE, vol. 7798, Jan. 1, 2010, pp. 779814-1, XP009144529.
Michael Rubinstein et al. "A comparative study of image retargeting", ACM SIGGRAPH Asia Jan. 1, 2010, p. 1, XP055241468.
Non-patent document cited in JP-OA1.

* cited by examiner

METHOD AND TERMINAL DEVICE FOR RETARGETING IMAGES

CROSS-REFERENCE TO RELATED APPLICATIONS

This application is a Continuation of International Application No. PCT/CN2014/091752, filed on Nov. 20, 2014, which is based upon and claims priority to Chinese Patent Application No. 201410287125.7, filed on Jun. 24, 2014, the entire contents of which are incorporated herein by reference.

TECHNICAL FIELD

The present disclosure relates to the computer technology field, and more particularly, to a method and a terminal device for image retargeting.

BACKGROUND

Image retargeting technology is an image processing technology which compresses and deforms redundant information in an image or carves the redundant information based on image contents. It is common to adopt an image retargeting technology based on seam carving algorithm to remove redundant information in images.

In the course of retargeting an image using the seam carving algorithm, firstly, a terminal device obtains color feature vectors of each pixel from an original image, then determines pixel seams composed of pixel points with high redundancy in the image according to the color feature vectors and parameters of the original image, such as image contents and resolution of the image or the like, and then carves out the determined redundant pixel seams, and finally obtains a retargeted image.

SUMMARY

The present disclosure provides a method and a terminal device for image retargeting.

According to a first aspect of embodiments of the present disclosure, a method for image retargeting is provided. The method includes: establishing a saliency model for an original image; calculating a saliency value of each pixel point in the original image based on the saliency model; and retargeting a target image according to the saliency value of each pixel point, original resolution of the original image and target resolution of the target image.

According to a second aspect of embodiments of the present disclosure, a terminal device is provided. The terminal device includes: a processor and a memory for storing instructions executable by the processor, wherein the processor is configured to perform: establishing a saliency model for an original image; calculating a saliency value of each pixel point in the original image based on the saliency model; and retargeting a target image according to the saliency value of each pixel point, original resolution of the original image and target resolution of the target image.

According to a third aspect of embodiments of the present disclosure, there is provided a non-transitory computer readable storage medium comprising instructions, executable by a processor in a terminal device, for performing a method for image retargeting, the method including: establishing a saliency model for an original image; calculating a saliency value of each pixel point in the original image based on the saliency model; and retargeting a target image according to the saliency value of each pixel point, original resolution of the original image and target resolution of the target image.

The technical solutions provided by embodiments of the present disclosure may include, in part, the advantageous effects as below.

By establishing a saliency model for an original image, and calculating a saliency value of each pixel point in the original image based on the saliency model, a target image is retargeted according to the saliency value of each pixel point, original resolution of the original image and target resolution of the target image. A pixel point having a higher saliency value indicates that the pixel point is more important, and thus performing retargeting on the target image according to the saliency value of pixel points is equivalent to performing retargeting on the target image according to the importance of pixel points, and this does not need to analyze image contents of an original image to obtain important pixel points. Thus, the problem of complicated analysis process and huge calculation amount caused by analyzing image contents of the original image to obtain important pixel points is solved. Consequently, effects of reducing calculation amount may be achieved.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this specification, illustrate embodiments consistent with the invention and, together with the description, serve to explain the principles of the invention.

DETAILED DESCRIPTION

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments do not represent all implementations consistent with the invention. Instead, they are merely examples of apparatuses and methods consistent with aspects related to the invention as recited in the appended claims.

Figure 1:
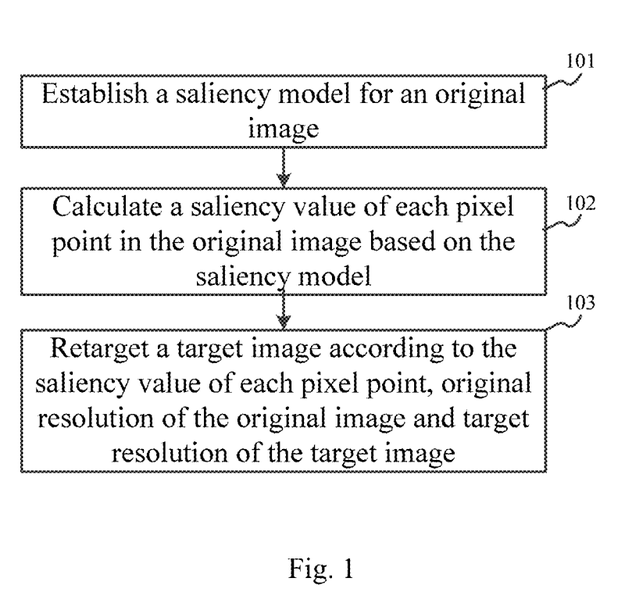
FIG. 1 is a flowchart showing a method for image retargeting according to an exemplary embodiment.

FIG. 1 is a flowchart showing a method for image retargeting according to an exemplary embodiment. The method for image retargeting is implemented by a terminal device. As shown in FIG. 1, the method for image retargeting includes the following steps.

In step 101, a saliency model for an original image is established.

The saliency model is configured for representing influence on the saliency value of pixel points imposed by pixel points of other different color values or pixel points having greatly different color values.

In step 102, a saliency value of each pixel point in the original image is calculated based on the saliency model.

In step 103, a target image is retargeted according to the saliency value of each pixel point, original resolution of the original image and target resolution of the target image.

A pixel point having a higher saliency value indicates that the pixel point is more important. Therefore, a terminal device may determine importance of the each pixel point according to the saliency value of the each pixel point in the original image, and retarget the original image from the original resolution to the target resolution according to the importance of the pixel points so as to obtain the target image.

The terminal device is able to analyze the important pixel points according to the saliency value of the pixel points without analyzing the image contents of the original image to obtain the important pixel points, and thus the course of retargeting the original image is simplified and calculation amount during retargeting of images is greatly reduced.

In conclusion, according to the method for image retargeting provided in the present disclosure, By establishing a saliency model for an original image, and calculating a saliency value of each pixel point in the original image based on the saliency model, a target image is retargeted according to the saliency value of each pixel point, original resolution of the original image and target resolution of the target image. A pixel point having a higher saliency value indicates that the pixel point is more important, and thus performing retargeting on the target image according to the saliency value of the pixel points is equivalent to performing retargeting on the target image according to the importance of the pixel points, and this does not need to analyze image contents of an original image to obtain the important pixel points. Thus, the problem of complicated analysis process and huge calculation amount caused by analyzing image contents of the original image to obtain the important pixel points is solved. Consequently, effects of reducing calculation amount may be achieved.

Figure 2A:
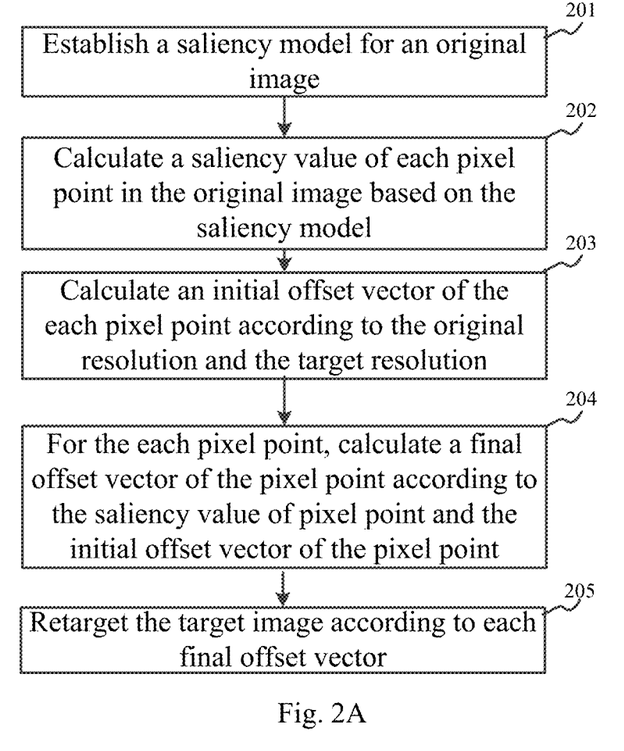
FIG. 2A is a flowchart showing a method for image retargeting according to another exemplary embodiment.

FIG. 2A is a flowchart showing a method for image retargeting according to another exemplary embodiment. The method for image retargeting is implemented by a terminal device. As shown in FIG. 2A, the method for image retargeting includes the following steps.

In step 201, a saliency model for an original image is established.

The saliency model is configured for representing influence on the saliency value of pixel points imposed by pixel points of other different color values or pixel points having greatly different color values.

In the present embodiment, two modes for establishing a saliency model are provided, and the establishing process is as follows.

First mode: over-division is performed on an original image according to a predetermined over-division algorithm to obtain at least one region, and color values of respective pixel points in the same region are the same; a color value and a center of mass of each region are determined; and a saliency model is established according to the color value corresponding to each region and the center of mass of each region.

Performing over-division on the original image refers to dividing the image into different region, and pixel points in each region have the same certain property, for example, the color values of respective pixel points in an over-divided region are the same, or the color values of respective pixel points in an over-divided region are very close to each other.

Since respective pixel points in an over-divided region have the same color values, it is able to determine the color value of the region, and for each region, the center of mass corresponding to the region may also be calculated.

The saliency model is established according to the above mode is as follows:

$$S_{i1} \sum_{j=1, j \neq i}^{N} w(R_j) D_S(R_i, R_j) D_C(R_i, R_j),$$

where $S_{i1}$ is a saliency value of any pixel point in an region $R_i$, $w(R_j)$ is the number of pixel points in the region $R_j$, $D_S(R_i, R_j)$ represents a measurement of difference in space positions between the regions $R_i$ and $R_j$, $D_C(R_i, R_j)$ represents a measurement of difference in colors between regions $R_i$ and $R_j$, N a total number of regions after over-divisions on an image.

$D_S(R_i, R_j)$ is: $D_S(R_i, R_j) = \exp(-(Center(R_i) - Center(R_j))^2 / (\sigma_s^2))$, where $Center(R_i)$ is a center of mass of the region $R_i$, and $Center(R_j)$ is a center of mass of the region $R_j$. If the coordinate of the each pixel point in the image is normalized into [0,1], $\sigma_s^2 = 0.4$. $D_C(R_i, R_j)$ may be represented by an Euclidean distance between an average color value in the region $R_i$ and an average color value in the region $R_j$. The average color value in a region refers to sum of the color values of respective pixel points in the region divided by the number of the pixel points in the region.

Second mode: respective pixel points in the original image are classified according to the color value of each pixel point so that the pixel points with the same color value are classified into the same color type; and a saliency model is established according to the color value of each color type.

In actual application, storage spaces, which are for storing pixel points and are corresponding to the color values, may be provided, and the number of the storage spaces may generally be 256*256*256. The pixel points in the original image are read in sequence and placed in a storage space corresponding to the color value of the each pixel point so that respective pixel points stored in each storage space have the same color value.

The saliency model is established according to the above mode is as follows:

$$S_{i2} = \sum_{j=1, j \neq i}^{N} w(P_j) D_C(P_i, P_j),$$

where $w(P_j)$ is the number of pixel points having a color type of $P_j$, $D_C(P_i, P_j)$ represents a measurement of difference in space positions between the color type $P_i$ and the color type $P_j$, $D_C(P_i, P_j)$ may be represented by an Euclidean Distance between the color value of the color type $P_i$ and the color value of color type $P_j$.

In step 202, a saliency value of each pixel point in the original image is calculated based on the saliency model.

The terminal device may establish a saliency model according to any one method provided in step 201, and calculate the saliency value of the each pixel point in the original image according to the obtained saliency model.

In step 203, an initial offset vector of each pixel point is calculated according to the original resolution and the target resolution.

The original resolution refers to the resolution of the original image, for example, the original resolution is 60*60. The target resolution refers to the resolution of a target image which is obtained after performing retargeting on the original image, for example, the target resolution is 40*60. The initial offset vector refers to an offset vector between a position where the pixel point located in the original image and a position where the pixel point located in the target image when the original image is scaled with the same ratio from the original resolution to the target resolution.

The step of calculating an initial offset vectors of each pixel point according to the original resolution and the target resolution includes the following substeps.

1) At first, an original image region is determined according to the original resolution; a target image region is determined according to the original resolution and the target resolution.

2) Secondly, a predetermined number of first feature points are selected from the original image region, and a predetermined number of second feature points are selected from the target image region, wherein the first feature points are corresponding to the second feature points.

3) Then, a reference offset vector between each first feature point and a corresponding second feature point is calculated.

4) Finally, for each pixel point, a relative position between the pixel point and n first feature points is calculated, the pixel point is located in a closed region enclosed by the n first feature points, n≥3; and the initial offset vector of the pixel point is calculated according to the relative position and n reference offset vectors corresponding to the n first feature points.

The reference offset vector refers to an offset vector between a position where a selected feature point located in the original image and a position where the feature point located in the target image when the original image is scaled with the same ratio from the original resolution to the target resolution.

Figure 2B:
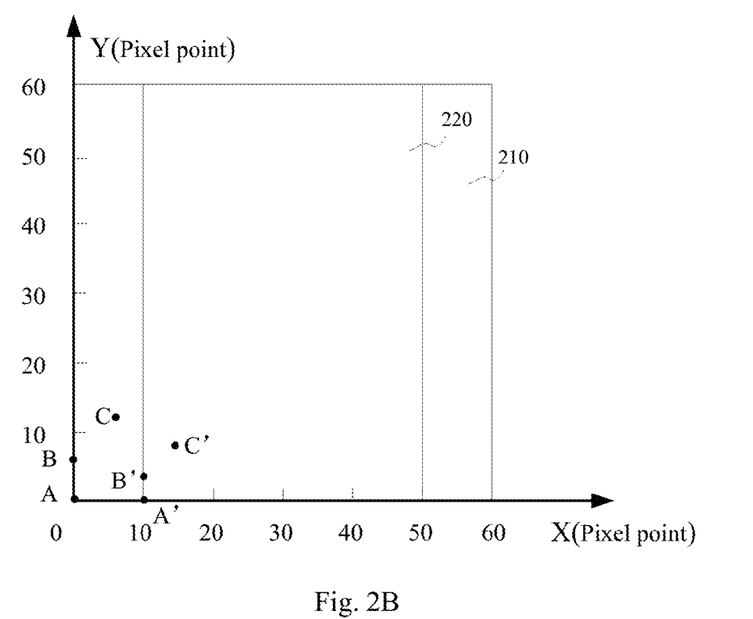
FIG. 2B is a diagram showing a scene for calculating an initial offset vector according to an exemplary embodiment.

FIG. 2B is a diagram showing a scene for calculating an initial offset vector, which is described with an example where the original resolution is 60*60, and the target resolution is 40*60, and then a coordinate is established by taking a pixel point as a unit. In the coordinate, the original image region 210 has a range of 0~60 along the x axis, and has a range of 0~60 along the y axis; the target image region 220 has a range of 10~50 along the x axis, and has a range of 0~60 along the y axis.

It is assumed that 10*10 first feature points are uniformly selected from the original image region, i.e., 10 rows of first feature points are selected in the original image region, and 10 first feature points are selected from each row. The coordinates of the selected first feature points may be A (0, 0), B (0, 6), C (6, 12) and so on. Since second feature points corresponding to the first feature points need to be selected from the target image region, the coordinates of the selected second feature points corresponding to the first feature points may be A' (10, 0), B' (10, 4), C' (14, 8) and so on.

The first feature point A is corresponding to the second feature point A', and thus a reference offset vector $\overline{AA'}$ between the first feature point A and the second feature point A' may be calculated according to A (0, 0) and A' (10, 0).

Likewise, reference offset vectors between other first feature points and second feature points may be calculated.

Figure 2C:
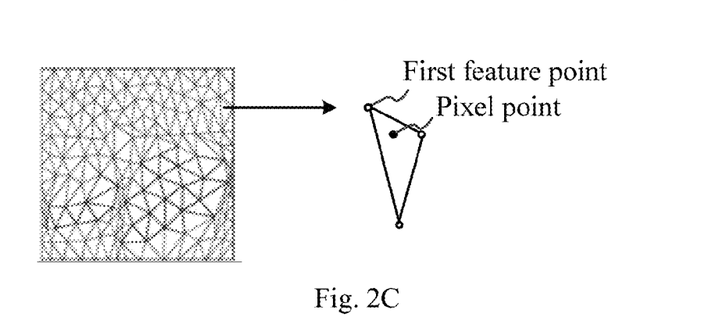
FIG. 2C is a diagram showing distribution of first feature points according to an exemplary embodiment.

After all the reference offset vectors are obtained, the terminal device may form a closed region with every n first feature points in the original image region. For example, if n=3, then a diagram showing distribution of first feature points as shown in FIG. 2C may be obtained. FIG. 2C is described with an example of one triangle in the diagram showing the distribution of first feature points, and the three vertexes of the triangle are three first feature points, as indicated by white dots, and the pixel points in the triangle are indicated by black dots.

The terminal device may calculate a relative position of each pixel point in the triangle including the pixel point, and calculate the initial offset vector of the pixel point according to the relative position and three reference offset vectors respectively corresponding to the three first feature points enclosing the triangle, and then obtain the following initial offset vector of the pixel point with the coordinate of (x, y): $\overline{(\Delta x_{(x,y)}, \Delta y_{(x,y)})}$.

In step 204, for the each pixel point, the final offset vector of the pixel point is calculated according to the saliency value of the pixel point and the initial offset vector of the pixel point.

The final offset vector refers to an offset vector between a position where the pixel point located in the original image and a position where the pixel point located in the target image when the original image is retargeted from the original resolution to the target resolution according to the saliency value.

A pixel point having a higher saliency value indicates that the pixel point is more important. Thus, in order to avoid the problem of distortion of important region due to relative larger initial offset vectors of important pixel points, the terminal device needs to further process the initial offset vectors of the pixel points according to the saliency values so as to reduce the initial offset vectors of the pixel points with a relative larger saliency value, thereby improving the effect of image retargeting.

The step of calculating a final offset vector according to the saliency value of the pixel point and the initial offset vector of the pixel point includes the following substeps.

1) At first, a distortion coefficient of the pixel point is calculated according to the saliency value of the pixel point; wherein the saliency value has a negative correlation with the distortion coefficient.

2) Then, the distortion coefficient is multiplied by the initial offset vector to obtain the final offset vector.

The distortion coefficient refers to a coefficient which is multiplied when performing distortion on the pixel point. The distortion coefficient has a negative correlation with the saliency value of a pixel point. That is to say, a larger saliency value of a pixel point will result in a smaller distortion coefficient of the pixel point, while a smaller distortion coefficient of a pixel point will result in a larger distortion coefficient of the pixel point.

In the present embodiment, the distortion coefficient is:

$$Coeff_{(x,y)} = 1 - \frac{(S_{(x,y)} - S_{min})}{(S_{max} - S_{min})},$$

wherein $S_{(x, y)}$ represents the saliency value of a pixel point with a coordinate of (x, y), $S_{min}$ represents the minimum among all saliency values, and $S_{max}$ represents the maximum among all saliency values.

After the distortion coefficient and the initial offset vector of a pixel point are obtained, the distortion coefficient may be multiplied by the initial offset vector to obtain the final offset vector of the pixel point. That is to say, the final offset vector of the pixel point is $\overline{(\Delta x_{(x,y)}, \Delta y_{(x,y)})}^* = \text{Coeff}_{(x, y)} * \overline{(\Delta x_{(x,y)}, \Delta y_{(x,y)})}$.

In step 205, a target image is retargeted according to each final offset vector.

The terminal device may retarget the original image from an original resolution to a target resolution according to the final offset vector so as to obtain a target image.

In the present embodiment, the terminal device analyzes important pixel points according to the saliency values of pixel points so as to reduce the final offset vectors of important pixel points, without analyzing image contents of the original image to obtain important pixel points. Thus, the course of retargeting of the original image is simplified, and calculation amount during retargeting of image is greatly reduced.

In conclusion, according to the method for image retargeting provided in the present disclosure, by establishing a saliency model for an original image, and calculating a saliency value of each pixel point in the original image based on the saliency model, a target image is retargeted according to the saliency value of each pixel point, original resolution of the original image and target resolution of the target image. A pixel point having a higher saliency value indicates that the pixel point is more important, and thus performing retargeting on the target image according to the saliency value of the pixel points is equivalent to performing retargeting on the target image according to the importance of the pixel points, and this does not need to analyze image contents of an original image to obtain the important pixel points. Thus, the problem of complicated analysis process and huge calculation amount caused by analyzing image contents of the original image to obtain the important pixel points is solved. Consequently, effects of reducing calculation amount may be achieved.

In addition, by calculating a distortion coefficient of a pixel point according to the saliency value of the pixel point, wherein the saliency value has a negative correlation with distortion coefficient, and by multiplying the distortion coefficient by the initial offset vector to obtain the final offset vector, the final offset vectors of the pixel points with high saliency value may be reduced, i.e. distortion of important regions may be reduced. Thus, effects of image retargeting are improved.

Figure 3:
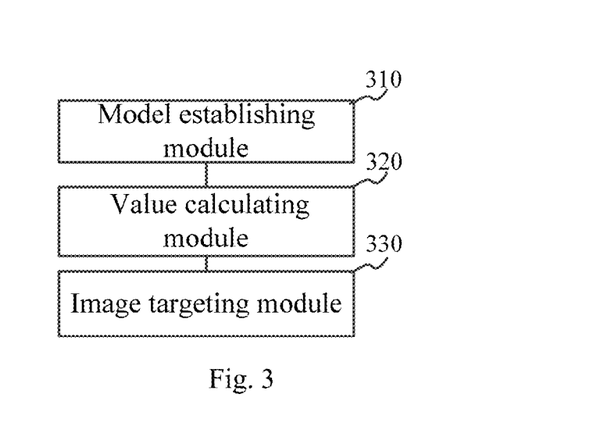
FIG. 3 is a block diagram showing an apparatus for image retargeting according to an exemplary embodiment.

FIG. 3 is a block diagram showing an apparatus for image retargeting according to an exemplary embodiment. The apparatus for image retargeting is included in a terminal device. As shown in FIG. 3, the apparatus for image retargeting includes a model establishing module 310, a value calculating module 320 and an image targeting module 330.

The model establishing module 310 is configured to establish a saliency model for an original image.

The value calculating module 320 is configured to calculate a saliency value of each pixel point in the original image based on the saliency model established by the model establishing module 310.

The image targeting module 330 is configured to retarget a target image according to the saliency value of each pixel point calculated by the value calculating module 320, original resolution of the original image and target resolution of the target image.

In conclusion, according to the apparatus for image retargeting provided in the present disclosure, by establishing a saliency model for an original image, and calculating a saliency value of each pixel point in the original image based on the saliency model, a target image is retargeted according to the saliency value of each pixel point, original resolution of the original image and target resolution of the target image. A pixel point having a higher saliency value indicates that the pixel point is more important, and thus performing retargeting on the target image according to the saliency value of the pixel points is equivalent to performing retargeting on the target image according to the importance of the pixel points, and this does not need to analyze image contents of an original image to obtain the important pixel points. Thus, the problem of complicated analysis process and huge calculation amount caused by analyzing image contents of the original image to obtain the important pixel points is solved. Consequently, effects of reducing calculation amount may be achieved.

Figure 4:
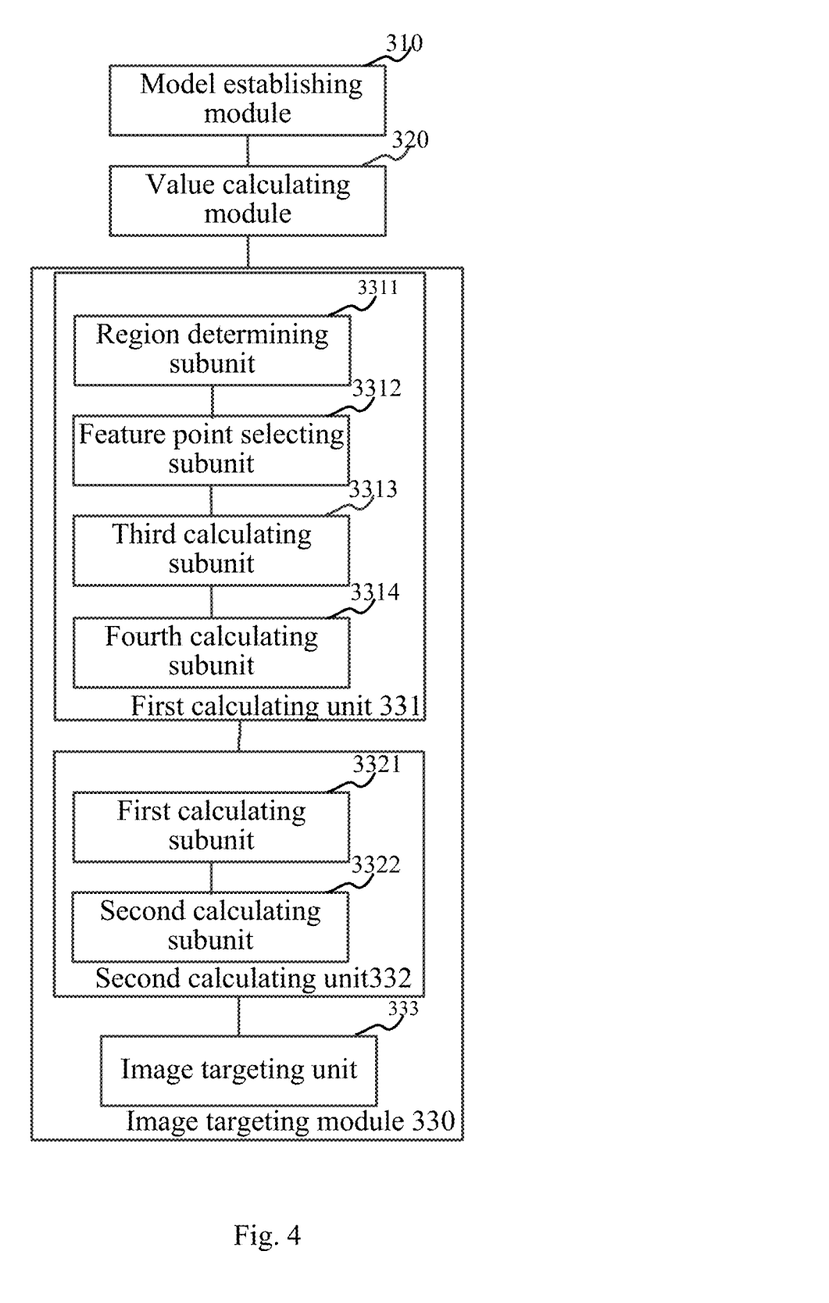
FIG. 4 is a block diagram showing an apparatus for image retargeting according to an exemplary embodiment.

FIG. 4 is a block diagram showing an apparatus for image retargeting according to an exemplary embodiment. The apparatus for image retargeting is included in a terminal device. As shown in FIG. 4, the apparatus for image retargeting includes a model establishing module 310, a value calculating module 320 and an image targeting module 330.

The model establishing module 310 is configured to establish a saliency model for an original image.

The value calculating module 320 is configured to calculate a saliency value of each pixel point in the original image based on the saliency model established by the model establishing module 310.

The image targeting module 330 is configured to retarget a target image according to the saliency value of each pixel point calculated by the value calculating module 320, original resolution of the original image and target resolution of the target image.

Optionally, the image targeting module 330 includes a first calculating unit 331, a second calculating unit 332 and an image targeting unit 333.

The first calculating unit 331 is configured to calculate an initial offset vector of the each pixel point according to the original resolution and the target resolution.

The second calculating unit 332 is configured to, for the each pixel point, calculate a final offset vector of the pixel point according to the saliency value of pixel point and the initial offset vector of the pixel point calculated by the first calculating unit 331.

The image positing unit 333 is configured to retarget the target image according to each final offset vector calculated by the second calculating unit 332.

Optionally, the second calculating unit 332 includes a first calculating subunit 3321 and a second calculating subunit 3322.

The first calculating subunit 3321 is configured to calculate a distortion coefficient of a pixel point according to the saliency value of the pixel point. The saliency value has a negative correlation with the distortion coefficient.

The second calculating subunit 3322 is configured to multiply the distortion coefficient calculated by the first calculating subunit 3321 by the initial offset vector to obtain the final offset vector.

Optionally, the distortion coefficient is:

$$Coeff_{(x,y)} = 1 - \frac{(S_{(x,y)} - S_{min})}{(S_{max} - S_{min})},$$

wherein $S_{(x, y)}$ represents the saliency value of a pixel point with a coordinate of (x, y), $S_{min}$ represents the minimum among all saliency values, and $S_{max}$ represents the maximum among all saliency values.

Optionally, the first calculating unit 331 includes a region determining subunit 3311, a feature point selecting subunit 3312, a third calculating subunit 3313 and a fourth calculating subunit 3314.

The region determining subunit 3311 is configured to determine an original image region according to the original resolution, and determine a target image region according to the original resolution and the target resolution.

The feature point selecting subunit 3312 is configured to select a predetermined number of first feature points from the original image region determined by the region determining subunit 3311 and a predetermined number of second feature points from the target image region determined by the region determining subunit 3311. The first feature points are corresponding to the second feature points.

The third calculating subunit 3313 is configured to calculate a reference offset vector between each first feature point and a corresponding second feature point selected by the feature point selecting subunit 3312.

The fourth calculating subunit 3314 is configured to, for each pixel point, calculate a relative position between the pixel point and n first feature points, wherein the pixel point is located in a closed region enclosed by the n first feature points, n≥3; and to calculate the initial offset vector of the pixel point according to the relative position and n reference offset vectors corresponding to the n first feature points calculated by the third calculating subunit 3313.

In conclusion, according to the apparatus for image retargeting provided in the present disclosure, by establishing a saliency model for an original image, and calculating a saliency value of each pixel point in the original image based on the saliency model, a target image is retargeted according to the saliency value of the each pixel point, the original resolution of the original image and the target resolution of the target image. A pixel point having a higher saliency value indicates that the pixel point is more important, and thus performing retargeting on the target image according to the saliency value of the pixel points is equivalent to performing retargeting on the target image according to the importance of the pixel points, and this does not need to analyze image contents of an original image to obtain the important pixel points. Thus, the problem of complicated analysis process and huge calculation amount caused by analyzing image contents of the original image to obtain the important pixel points is solved. Consequently, effects of reducing calculation amount may be achieved.

In addition, by calculating a distortion coefficient of a pixel point according to the saliency value of the pixel point, wherein the saliency value has a negative correlation with distortion coefficient, and by multiplying the distortion coefficient by the initial offset vector to obtain the final offset vector, the final offset vectors of the pixel points with high saliency value may be reduced, i.e. distortion of important regions may be reduced. Thus, effects of image retargeting are improved.

With respect to the apparatus in the above embodiments, specific implementations for individual modules to perform operations have been described in detail in the embodiments of the methods, and detailed descriptions thereof are omitted here.

An exemplary embodiment of the present disclosure provides a terminal device which is able to implement the method for image retargeting provided by the present disclosure. The terminal device includes: a processor and a memory for storing instructions executable by the processor, wherein the processor is configured to perform: establishing a saliency model for an original image; calculating a saliency value of each pixel point in the original image based on the saliency model; retargeting a target image according to the saliency value of each pixel point, original resolution of the original image and target resolution of the target image.

With respect to the terminal device in the above embodiments, the specific implementations for the processor to perform operations have been described in detail in the embodiments of the methods, and detailed descriptions thereof are omitted here.

Figure 5:
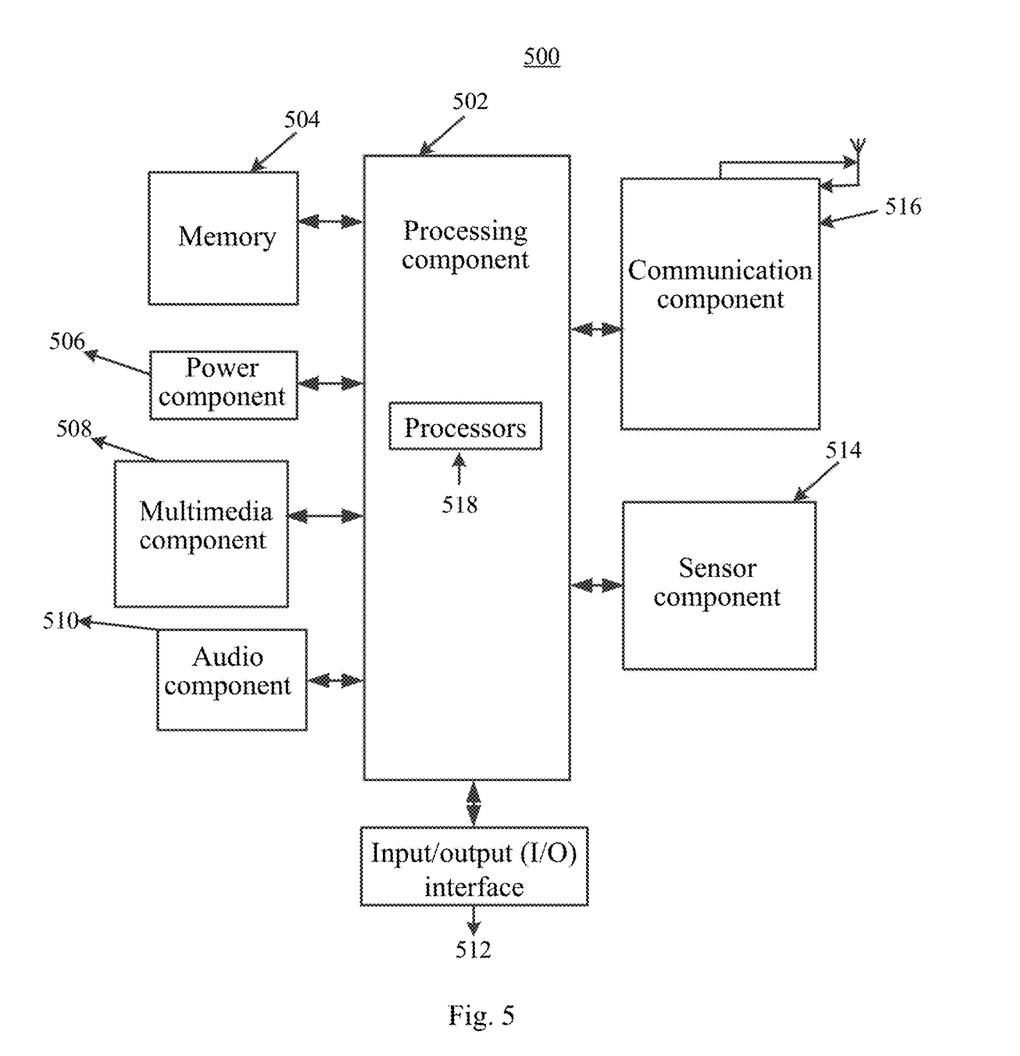
FIG. 5 is a block diagram showing a terminal device for image retargeting according to an exemplary embodiment.

FIG. 5 is a block diagram showing a terminal device 500 for image retargeting according to an exemplary embodiment. The terminal device 500 may be a mobile phone, a computer, a digital broadcast terminal device, a messaging device, a gaming console, a tablet, a medical device, exercise equipment, a personal digital assistant, and the like.

Referring to FIG. 5, the terminal device 500 may include one or more of the following components: a processing component 502, a memory 504, a power component 506, a multimedia component 508, an audio component 510, an input/output (I/O) interface 512, a sensor component 514, and a communication component 516.

The processing component 502 typically controls overall operations of the terminal device 500, such as the operations associated with display, telephone calls, data communications, camera operations, and recording operations. The processing component 502 may include one or more processors 518 to execute instructions to perform all or part of the steps in the above-described methods. Moreover, the processing component 502 may include one or more modules which facilitate the interaction between the processing component 502 and other components. For instance, the processing component 502 may include a multimedia module to facilitate the interaction between the multimedia component 508 and the processing component 502.

The memory 504 is configured to store various types of data to support the operation of the terminal device 500. Examples of such data include instructions for any applications or methods operated on the terminal device 500, contact data, phonebook data, messages, pictures, video, and so on. The memory 504 may be implemented using any type of volatile or non-volatile memory devices, or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic or optical disk.

The power component 506 provides power to various components of the terminal device 500. The power component 506 may include a power management system, one or more power supplies, one or more power management modes, and other components associated with the generation, management, and distribution of power in the terminal device 500.

The multimedia component 508 includes a screen providing an output interface between the terminal device 500 and the user. In some embodiments, the screen may include a liquid crystal display (LCD) and a touch panel (TP). If the screen includes the touch panel, the screen may be implemented as a touch screen to receive input signals from the user. The touch panel includes one or more touch sensors to sense touches, swipes, and gestures on the touch panel. The touch sensors may not only sense a boundary of a touch or swipe action, but also sense a period of time and a pressure associated with the touch or swipe action. In some embodiments, the multimedia component 508 includes a front camera and/or a rear camera. The front camera and the rear camera may receive an external multimedia datum while the terminal device 500 is in an operation mode, such as a photographing mode or a video mode. Each of the front camera and the rear camera may be a fixed optical lens system or have focus and optical zoom capability.

The audio component 510 is configured to output and/or input audio signals. For example, the audio component 510 includes a microphone (MIC) configured to receive an external audio signal when the terminal device 500 is in an operation mode, such as a call mode, a recording mode, and a voice recognition mode. The received audio signal may be further stored in the memory 504 or transmitted via the communication component 516. In some embodiments, the audio component 510 further includes a speaker to output audio signals.

The I/O interface 512 provides an interface between the processing component 502 and peripheral interface modules, such as a keyboard, a click wheel, buttons, and the like. The buttons may include, but are not limited to, a home button, a volume button, a starting button, and a locking button.

The sensor component 514 includes one or more sensors to provide status assessments of various aspects of the terminal device 500. For instance, the sensor component 514 may detect an open/closed status of the terminal device 500, relative positioning of components, e.g., the display and the keypad, of the terminal device 500, a change in position of the terminal device 500 or a component of terminal device 500, a presence or absence of user contact with the terminal device 500, an orientation or an acceleration/deceleration of the terminal device 500, and a change in temperature of the terminal device 500. The sensor component 514 may include a proximity sensor configured to detect the presence of nearby objects without any physical contact. The sensor component 514 may also include a light sensor, such as a CMOS or CCD image sensor, for use in imaging applications. In some embodiments, the sensor component 514 may also include an accelerometer sensor, a gyroscope sensor, a magnetic sensor, a pressure sensor, or a temperature sensor.

The communication component 516 is configured to facilitate communication, wired or wirelessly, between the terminal device 500 and other devices. The terminal device 500 can access a wireless network based on a communication standard, such as WiFi, 2G, or 3G, or a combination thereof. In one exemplary embodiment, the communication component 516 receives a broadcast signal or broadcast associated information from an external broadcast management system via a broadcast channel. In one exemplary embodiment, the communication component 516 further includes a near field communication (NFC) module to facilitate short-range communications. For example, the NFC module may be implemented based on a radio frequency identification (RFID) technology, an infrared data association (IrDA) technology, an ultra-wideband (UWB) technology, a Bluetooth (BT) technology, and other technologies.

In exemplary embodiments, the terminal device 500 may be implemented with one or more application specific integrated circuits (ASICs), digital signal processors (DSPs), digital signal processing devices (DSPDs), programmable logic devices (PLDs), field programmable gate arrays (FPGAs), controllers, micro-controllers, microprocessors, or other electronic components, for performing the above described methods.

In exemplary embodiments, there is also provided a non-transitory computer-readable storage medium including instructions, such as included in the memory 504, executable by the processor 518 in the terminal device 500, for performing the above-described client side methods. For example, the non-transitory computer-readable storage medium may be a ROM, a RAM, a CD-ROM, a magnetic tape, a floppy disc, an optical data storage device, and the like.

Other embodiments of the invention will be apparent to those skilled in the art from consideration of the specification and practice of the invention disclosed here. This application is intended to cover any variations, uses, or adaptations of the invention following the general principles thereof and including such departures from the present disclosure as come within known or customary practice in the art. It is intended that the specification and examples be considered as exemplary only, with a true scope and spirit of the invention being indicated by the following claims.

It will be appreciated that the present invention is not limited to the exact construction that has been described above and illustrated in the accompanying drawings, and that various modifications and changes can be made without departing from the scope thereof. It is intended that the scope of the invention only be limited by the appended claims.

What is claimed is:

1. A method for image retargeting, comprising:
establishing a saliency model for an original image;
calculating a saliency value of each pixel point in the original image based on the saliency model;
calculating an initial offset vector of the each pixel point according to original resolution of the original image and target resolution of a target image;
for the each pixel point, calculating a final offset vector of the pixel point according to the saliency value of the pixel point and the initial offset vector of the pixel point; and
retargeting the target image according to each final offset vector.

2. The method according to claim 1, wherein calculating a final offset vector of the pixel point according to the saliency value of the pixel point and the initial offset vector of the pixel point comprises:
calculating a distortion coefficient of the pixel point according to the saliency value of the pixel point, wherein the saliency value having a negative correlation with the distortion coefficient; and
multiplying the distortion coefficient by the initial offset vector to obtain the final offset vector.

3. The method according to claim 2, wherein the distortion coefficient is:

$$Coeff_{(x,y)} = 1 - \frac{(S_{(x,y)} - S_{min})}{(S_{max} - S_{min})},$$

wherein $S_{(x, y)}$ represents the saliency value of a pixel point with a coordinate of (x, y), $S_{min}$ represents the minimum among all saliency values, and $S_{max}$ represents the maximum among all saliency values.

4. The method according to claim 1, wherein calculating the initial offset vector of the each pixel point according to the original resolution and the target resolution comprises:
- determining an original image region according to the original resolution;
- determining a target image region according to the original resolution and the target resolution;
- selecting a predetermined number of first feature points from the original image region and a predetermined number of second feature points from the target image region, wherein the first feature points corresponding to the second feature points;
- calculating a reference offset vector between each first feature point and a corresponding second feature point;
- for each pixel point, calculating a relative position between the pixel point and n first feature points, wherein the pixel point is located in a closed region enclosed by the n first feature points, n≥3; and
- calculating the initial offset vector of the pixel point according to the relative position and n reference offset vectors corresponding to the n first feature points.

5. The method according to claim 2, wherein calculating the initial offset vector of the each pixel point according to the original resolution and the target resolution comprises:
- determining the original image region according to the original resolution;
- determining the target image region according to the original resolution and the target resolution;
- selecting the predetermined number of first feature points from the original image region and the predetermined number of second feature points from the target image region, wherein the first feature points corresponding to the second feature points;
- calculating the reference offset vector between each first feature point and the corresponding second feature point;
- for each pixel point, calculating the relative position between the pixel point and n first feature points, wherein the pixel point is located in the closed region enclosed by the n first feature points, n≥3; and
- calculating the initial offset vector of the pixel point according to the relative position and n reference offset vectors corresponding to the n first feature points.

6. The method according to claim 3, wherein calculating the initial offset vector of each pixel point according to the original resolution and the target resolution comprises:
- determining the original image region according to the original resolution;
- determining the target image region according to the original resolution and the target resolution;
- selecting the predetermined number of first feature points from the original image region and the predetermined number of second feature points from the target image region, wherein the first feature points corresponding to the second feature points;
- calculating the reference offset vector between each first feature point and the corresponding second feature point;
- for each pixel point, calculating the relative position between the pixel point and n first feature points, wherein the pixel point is located in the closed region enclosed by the n first feature points, n≥3; and
- calculating the initial offset vector of the pixel point according to the relative position and n reference offset vectors corresponding to the n first feature points.

7. A terminal device for image retargeting, comprising:
a processor; and
a memory for storing instructions executable by the processor,
wherein the processor is configured to perform:
- establishing a saliency model for an original image;
- calculating a saliency value of each pixel point in the original image based on the saliency model;
- calculating an initial offset vector of the each pixel point according to original resolution of the original image and target resolution of a target image;
- for the each pixel point, calculating a final offset vector of the pixel point according to the saliency value of the pixel point and the initial offset vector of the pixel point; and
- retargeting the target image according to each final offset vector.

8. The terminal device according to claim 7, wherein calculating a final offset vector of the pixel point according to the saliency value of the pixel point and the initial offset vector of the pixel point comprises:
- calculating a distortion coefficient of the pixel point according to the saliency value of the pixel point, wherein the saliency value having a negative correlation with the distortion coefficient; and
- multiplying the distortion coefficient by the initial offset vector to obtain the final offset vector.

9. The terminal device according to claim 8, wherein the distortion coefficient is:

$$Coeff_{(x,y)} = 1 - \frac{(S_{(x,y)} - S_{min})}{(S_{max} - S_{min})},$$

wherein $S_{(x, y)}$ represents the saliency value of a pixel point with a coordinate of (x, y), $S_{min}$ represents the minimum among all saliency values, and $S_{max}$ represents the maximum among all saliency values.

10. The terminal device according to claim 7, wherein calculating the initial offset vector of the each pixel point according to the original resolution and the target resolution comprises:
- determining an original image region according to the original resolution;
- determining a target image region according to the original resolution and the target resolution;
- selecting a predetermined number of first feature points from the original image region and a predetermined number of second feature points from the target image region, wherein the first feature points corresponding to the second feature points;
- calculating a reference offset vector between each first feature point and a corresponding second feature point;
- for each pixel point, calculating a relative position between the pixel point and n first feature points, wherein the pixel point is located in a closed region enclosed by the n first feature points, n≥3; and
- calculating the initial offset vector of the pixel point according to the relative position and n reference offset vectors corresponding to the n first feature points.

11. The terminal device according to claim 8, wherein calculating the initial offset vector of the each pixel point according to the original resolution and the target resolution comprises:
- determining the original image region according to the original resolution;
- determining the target image region according to the original resolution and the target resolution;

selecting the predetermined number of first feature points from the original image region and the predetermined number of second feature points from the target image region, wherein the first feature points corresponding to the second feature points;

calculating the reference offset vector between each first feature point and the corresponding second feature point;

for each pixel point, calculating the relative position between the pixel point and n first feature points, wherein the pixel point is located in the closed region enclosed by the n first feature points, n≥3; and calculating the initial offset vector of the pixel point according to the relative position and n reference offset vectors corresponding to the n first feature points.

12. The terminal device according to claim 9, wherein calculating the initial offset vector of each pixel point according to the original resolution and the target resolution comprises:

determining the original image region according to the original resolution;

determining the target image region according to the original resolution and the target resolution;

selecting the predetermined number of first feature points from the original image region and the predetermined number of second feature points from the target image region, wherein the first feature points corresponding to the second feature points;

calculating the reference offset vector between each first feature point and the corresponding second feature point;

for each pixel point, calculating the relative position between the pixel point and n first feature points, wherein the pixel point is located in the closed region enclosed by the n first feature points, n≥3; and calculating the initial offset vector of the pixel point according to the relative position and n reference offset vectors corresponding to the n first feature points.

13. A non-transitory computer readable storage medium comprising instructions, executable by a processor in a terminal device, for performing a method for image retargeting, the method comprising:

establishing a saliency model for an original image;

calculating a saliency value of each pixel point in the original image based on the saliency model;

calculating an initial offset vector of the each pixel point according to original resolution of the original image and target resolution of a target image;

for the each pixel point, calculating a final offset vector of the pixel point according to the saliency value of the pixel point and the initial offset vector of the pixel point; and retargeting the target image according to each final offset vector.

14. The storage medium according to claim 13, wherein calculating a final offset vector of the pixel point according to the saliency value of the pixel point and the initial offset vector of the pixel point comprises:

calculating a distortion coefficient of the pixel point according to the saliency value of the pixel point, wherein the saliency value having a negative correlation with the distortion coefficient; and multiplying the distortion coefficient by the initial offset vector to obtain the final offset vector.

15. The storage medium according to claim 14, wherein the distortion coefficient is:

$$Coeff_{(x,y)} = 1 - \frac{(S_{(x,y)} - S_{min})}{(S_{max} - S_{min})},$$

wherein $S_{(x, y)}$ represents the saliency value of a pixel point with a coordinate of (x, y), $S_{min}$ represents the minimum among all saliency values, and $S_{max}$ represents the maximum among all saliency values.

16. The storage medium according to claim 13, wherein calculating the initial offset vector of the each pixel point according to the original resolution and the target resolution comprises:

determining an original image region according to the original resolution;

determining a target image region according to the original resolution and the target resolution;

selecting a predetermined number of first feature points from the original image region and a predetermined number of second feature points from the target image region, wherein the first feature points corresponding to the second feature points;

calculating a reference offset vector between each first feature point and a corresponding second feature point;

for each pixel point, calculating a relative position between the pixel point and n first feature points, wherein the pixel point is located in a closed region enclosed by the n first feature points, n≥3; and calculating the initial offset vector of the pixel point according to the relative position and n reference offset vectors corresponding to the n first feature points.

17. The storage medium according to claim 14, wherein calculating the initial offset vector of the each pixel point according to the original resolution and the target resolution comprises:

determining the original image region according to the original resolution;

determining the target image region according to the original resolution and the target resolution;

selecting the predetermined number of first feature points from the original image region and the predetermined number of second feature points from the target image region, wherein the first feature points corresponding to the second feature points;

calculating the reference offset vector between each first feature point and the corresponding second feature point;

for each pixel point, calculating the relative position between the pixel point and n first feature points, wherein the pixel point is located in the closed region enclosed by the n first feature points, n≥3; and calculating the initial offset vector of the pixel point according to the relative position and n reference offset vectors corresponding to the n first feature points.

* * * * *